US012562385B2

(12) United States Patent
Tei et al.

(10) Patent No.: US 12,562,385 B2
(45) Date of Patent: Feb. 24, 2026

(54) POSITIVE ELECTRODE ACTIVE MATERIAL AND MAGNESIUM SECONDARY BATTERY

(71) Applicant: Panasonic Intellectual Property Management Co., Ltd., Osaka (JP)

(72) Inventors: Go Tei, Osaka (JP); Takashi Oto, Osaka (JP); Tomofumi Hamamura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 707 days.

(21) Appl. No.: 17/659,762

(22) Filed: Apr. 19, 2022

(65) Prior Publication Data

US 2022/0246935 A1      Aug. 4, 2022

Related U.S. Application Data

(63) Continuation of application No. PCT/JP2020/027535, filed on Jul. 15, 2020.

(30) Foreign Application Priority Data

Feb. 21, 2020 (JP) ................................. 2020-028339

(51) Int. Cl.
| | |
|---|---|
| *H01M 10/054* | (2010.01) |
| *H01M 4/36* | (2006.01) |
| *H01M 4/58* | (2010.01) |
| *H01M 4/02* | (2006.01) |

(52) U.S. Cl.
CPC ......... *H01M 4/5815* (2013.01); *H01M 4/364* (2013.01); *H01M 10/054* (2013.01); *H01M 2004/028* (2013.01)

(58) Field of Classification Search
CPC .. H01M 4/5815; H01M 4/364; H01M 10/054; H01M 2004/028; H01M 10/05; C01B 17/42; Y02E 60/10
See application file for complete search history.

(56) References Cited

FOREIGN PATENT DOCUMENTS

| | | |
|---|---|---|
| CN | 103872375 | 6/2014 |
| CN | 109037623 | 12/2018 |
| JP | 2004-265675 | 9/2004 |
| JP | 2013-533577 | 8/2013 |
| WO | 2011/150093 | 12/2011 |

OTHER PUBLICATIONS

"Mg Intercalation in Layered and Spinel Host Crystal Structures for Mg Batteries"; Alexandra Emly and Anton Van der Ven; Inorganic Chemistry 2015 54 (9), 4394-4402; DOI: 10.1021/acs.inorgchem. 5b00188 (Year: 2015).*

(Continued)

*Primary Examiner* — Matthew T Martin
*Assistant Examiner* — Felicity B Alban
(74) *Attorney, Agent, or Firm* — CANTOR COLBURN LLP

(57) ABSTRACT

A positive electrode active material contains a composite sulfide containing Mg and at least one element selected from the group consisting of Ti, V, Cr, Mn, Fe, Ni, Cu, Zr, Nb, Mo, Ta, and W. The positive electrode active material has a crystal structure belonging to space group Fm-3m.

5 Claims, 3 Drawing Sheets

(56) References Cited

OTHER PUBLICATIONS

Gous et al. "First-Principles Study of Structural, Electronic and Magnetic Properties of Cr-Doped MgS", J Supercond Nov Magn, (Year: 2016).*

Qin et al. "The effect of Mg substitution for Ti on transport and thermoelectric properties of $TiS_2$", Journal of Applied Physics (Year: 2007).*

Sun et al. "Layered $TiS_2$ Positive Electrode for Mg Batteries"; ACS Energy Letters (Year: 2016).*

Shimokawa et al. "Zinc-based spinel cathode materials for magnesium rechargeable batteries: toward the reversible spinel-rocksalt transition"; Journal of Materials Chemistry A (Year: 2019).*

Okamoto et al. "Intercalation and Push-Out Process with Spinel-to-Rocksalt Transition on Mg Insertion into Spinel Oxides in Magnesium Batteries" (Year: 2015).*

Emly et al. "Mg intercalation in layered and spinel host crystal structures for Mg batteries"; Inorganic Chemistry (Year: 2015).*

Kolli et al. "First-Principles Study of Spinel $MgTiS_2$ as a Cathode Material"; Chemistry of Materials (Year: 2018).*

Ghbouli et al. Electronic structure and lattice dynamics of $Ca_xMg_{1-x}S$ in the rock-salt phase (Year: 2014).*

Wustrow et al. (Synthesis and Characterization of $MgCr_2S_4$ Thiospinel as a Potential Magnesium Cathode) DOI: 10.1021/acs.inorgchem. 8b01417 Inorg. Chem. 2018, 57, 8634-8638 (Year: 2018).*

International Search Report of PCT application No. PCT/JP2020/027535 dated Oct. 6, 2020.

Miao Liu et al., "Evaluation of sulfur spinel compounds for multivalent battery cathode applications", Energy & Environmental Science, 2016, vol. 9, first published Aug. 17, 2016.

* cited by examiner

POSITIVE ELECTRODE ACTIVE MATERIAL AND MAGNESIUM SECONDARY BATTERY

BACKGROUND

1. Technical Field

The present disclosure relates to a positive electrode active material and a magnesium secondary battery.

2. Description of the Related Art

In recent years, studies on magnesium secondary batteries have been in the spotlight.

Japanese Unexamined Patent Application Publication No. 2004-265675 discloses a nonaqueous electrolyte battery that includes a positive electrode containing sulfur as an active material, a negative electrode in which magnesium is an active material, and a nonaqueous electrolyte containing a magnesium salt.

Energy & Environmental Science (UK), 2016, Vol. 9, pp. 3201-32 discloses sulfur compounds having spinel crystal structures.

SUMMARY

One non-limiting and exemplary embodiment provides a novel positive electrode active material for magnesium secondary batteries. A magnesium secondary battery made therewith is also provided.

In one general aspect, the techniques disclosed here feature a positive electrode active material that contains a composite sulfide containing Mg and at least one element selected from the group consisting of Ti, V, Cr, Mn, Fe, Ni, Cu, Zr, Nb, Mo, Ta, and W. The positive electrode active material has a crystal structure belonging to space group Fm-3m.

According to aspects of the present disclosure, there can be provided a positive electrode active material for magnesium secondary batteries and a magnesium secondary battery made therewith.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
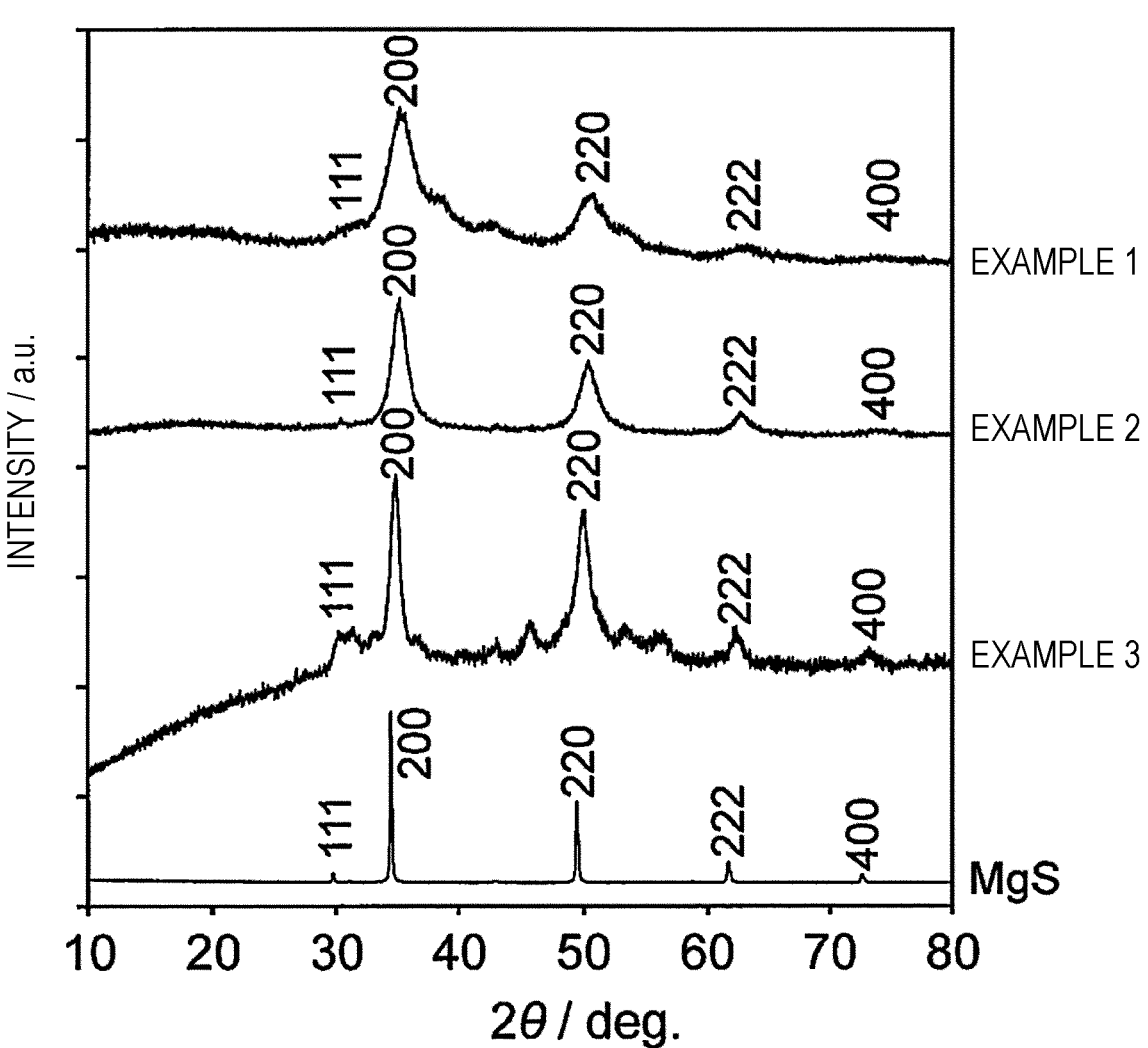
FIG. 1 is a graphical representation of measured powder x-ray diffraction patterns of the composite sulfides according to the Examples and MgS.

Underlying Knowledge Forming Basis of the Present Disclosure

The following describes the background of the inventors' conception of the positive electrode active material according to an aspect of the present disclosure.

Today's most common secondary batteries are lithium-ion secondary batteries. With the background of the rapid popularization of electric vehicles (EVs) in recent years, however, researchers are eager to find secondary batteries with a higher capacity than lithium-ion ones. Magnesium secondary batteries are promising candidates for high-capacity secondary batteries because of the two-electron reactions of magnesium they use to operate.

Examples of known positive electrode active materials for magnesium secondary batteries include transition metal oxides, such as vanadium oxide. A positive electrode active material made with vanadium oxide, unfortunately, has high activation barrier for the diffusion of magnesium ions because of strong interactions between the magnesium ions and oxygen. In other words, the magnesium ions do not move inside the active material smoothly, and the electrode reaction in the active material is sluggish. Magnesium secondary batteries made with a transition metal oxide as their positive electrode active material, therefore, charge and discharge only slowly.

Energy & Environmental Science (UK), 2016, Vol. 9, pp. 3201-32 mentions sulfides as compounds for the diffusion of magnesium ions. Because the activation barrier of sulfides can be lower than that of oxides, it is hoped that sulfides will be used to make the positive electrode of magnesium secondary batteries.

The inventors focused their attention on rock-salt-structured composite sulfides containing magnesium ions and transition metal elements. $MgMS_2$, a 1:1 (molar ratio) solid solution in which titanium, nickel, and/or other transition metals (M) and magnesium are dissolved, allows for the use of the two-electron reaction of the transition metal(s). Positive electrode active materials made with a rock-salt-structured composite sulfide, therefore, are expected to have a high theoretical capacity. Whereas the theoretical capacities of $MgTiS_2$ and $MgNiS_2$ are 393.4 mAh/g and 364.4 mAh/g, respectively, that of vanadium oxide is 294.8 mAh/g. The theoretical capacity of magnesium secondary batteries made with a positive electrode active material containing a rock-salt-structured composite sulfide is larger than that of magnesium secondary batteries made with an oxide-containing positive electrode active material. Thus far, however, it has been unknown that magnesium secondary batteries made with a positive electrode active material containing a rock-salt-structured composite sulfide charge and discharge reversibly. After extensive research, the inventors found that rock-salt-structured composite sulfides in which magnesium and transition metal(s) are dissolved make magnesium secondary batteries rechargeable. The present disclosure is based on these findings.

Overview of Aspects According to the Present Disclosure

A positive electrode active material according to a first aspect of the present disclosure contains:
- a composite sulfide containing Mg and at least one element selected from the group consisting of Ti, V, Cr, Mn, Fe, Ni, Cu, Zr, Nb, Mo, Ta, and W, wherein:
- the positive electrode active material has a crystal structure belonging to space group Fm-3m.

According to the first aspect, a novel, rechargeable magnesium secondary battery can be provided.

In a second aspect of the present disclosure, for example, the composite sulfide may be represented by a compositional formula $Mg_xM_yS_2$, where Mg is magnesium, M is the at least one element selected from the group consisting of Ti, V, Cr, Mn, Fe, Ni, Cu, Zr, Nb, Mo, Ta, and W, $0.8 < x < 1.3$, and $0.8 < y < 1.3$.

According to the second aspect, a novel, rechargeable magnesium secondary battery can be provided.

In a third aspect of the present disclosure, for example, the at least one element in the positive electrode active material according to the first or second aspect may be selected from the group consisting of Ti, Cr, and Ni. In such a configuration, a composite sulfide having a high theoretical capacity can be provided.

A magnesium secondary battery according to a fourth aspect of the present disclosure includes:

a positive electrode containing the positive electrode active material according to any one of the first to third aspects;

an electrolyte; and a negative electrode.

According to the fourth aspect, a novel, rechargeable magnesium secondary battery can be provided.

EMBODIMENTS OF THE PRESENT DISCLOSURE

The following describes embodiments of the present disclosure in detail. It should be noted that the following embodiments are merely examples; no aspect of the present disclosure is limited to these embodiments.

Embodiment 1

An example of a positive electrode active material contains a composite sulfide containing Mg and at least one element selected from the group consisting of Ti, V, Cr, Mn, Fe, Ni, Cu, Zr, Nb, Mo, Ta, and W. The positive electrode active material has a crystal structure belonging to space group Fm-3m. With such a positive electrode active material, a novel, rechargeable magnesium secondary battery can be provided. In this composite sulfide, the interactions between sulfur, which is the anion, and magnesium, which is a cation, are expected to be weak compared with those between oxygen and magnesium in oxides. The resulting smooth movement of magnesium inside the composite sulfide helps provide a novel, rechargeable magnesium secondary battery having a high theoretical capacity. This effect of the sulfur anion, i.e., smooth movement of magnesium, stems from interactions between magnesium and sulfur. The inventors believe this effect is expected to occur whatever the transition metal(s) in the composite sulfide is.

The composite sulfide has a crystal structure belonging to space group Fm-3m. An example of a crystal structure belonging to space group Fm-3m is the rock-salt crystal structure.

The element(s) contained in the positive electrode active material may be at least one selected from the group consisting of Ti, V, Cr, Mn, Fe, Ni, and Cu. These elements belong to period 4. In such a configuration, the theoretical capacity of the composite sulfide is expected to be higher.

The element(s) contained in the positive electrode active material may be at least one selected from the group consisting of Ti, Cr, and Ni. In such a configuration, the theoretical capacity of the composite sulfide is expected to be higher.

Another example of a positive electrode active material contains a composite sulfide represented by compositional formula (1) below. In compositional formula (1), Mg is magnesium, M includes at least one element selected from the group consisting of Ti, V, Cr, Mn, Fe, Ni, Cu, Zr, Nb, Mo, Ta, and W, $0.8 < x < 1.3$, and $0.8 < y < 1.3$. With such a positive electrode active material, a novel, rechargeable magnesium secondary battery can be provided.

$$Mg_xM_yS_2 \qquad\qquad (1)$$

In compositional formula (1), x may be greater than or equal to 0.85 or may be greater than or equal to 0.9. x may be smaller than or equal to 1.27 or may be smaller than or equal to 1.25. In such a configuration, the theoretical capacity of the composite sulfide is expected to be higher.

In compositional formula (1), y may be greater than or equal to 0.85 or may be greater than or equal to 0.9. y may be smaller than or equal to 1.27 or may be smaller than or equal to 1.25. In such a configuration, the theoretical capacity of the composite sulfide is expected to be higher.

In compositional formula (1), M may be at least one element selected from the group consisting of Ti, V, Cr, Mn, Fe, Ni, and Cu. These elements belong to period 4. In such a configuration, the theoretical capacity of the composite sulfide is expected to be higher.

In compositional formula (1), M may be at least one element selected from the group consisting of Ti, Cr, and Ni. In such a configuration, the theoretical capacity of the composite sulfide is expected to be higher.

The production of the composite sulfide can be, for example, as follows. First, starting materials containing magnesium, the transition metal(s), and sulfur are prepared, and amounts of them are weighed out, for example in a molar ratio between magnesium and the transition metal(s) of 1:1. The starting materials weighed out are then mixed together, for example by dry mixing or wet mixing. Allowing the starting materials to react mechanochemically inside a mixer, such as a planetary ball mill, will give the composite sulfide.

Examples of starting materials containing magnesium include magnesium and sulfides of magnesium. An example of a sulfide of magnesium sulfide is magnesium sulfide. Examples of starting materials containing transition metals include transition metals and sulfides of transition metals. Examples of starting materials containing sulfur include sulfides of magnesium, sulfides of transition metals, and sulfur.

The composition of the resulting composite sulfide can be determined by, for example, inductively coupled plasma (ICP) emission spectrometry. The crystal structure of the resulting composite sulfide can be determined by, for example, powder x-ray diffractometry (XRD).

The positive electrode active material may be primarily the composite sulfide. "Being primarily the composite sulfide" means the percentage by volume of the composite sulfide in the positive electrode active material is higher than 50%.

The shape of the composite sulfide is not critical. The composite sulfide is, for example, particulate in shape. If the composite sulfide is particulate, the average diameter of its particles is not critical. The average diameter of the particles may be larger than or equal to 0.1 μm and smaller than or equal to 50 μm. As mentioned herein, the average diameter of particles of a composite sulfide is a diameter determined from the size distribution by volume measured by laser diffraction and corresponding to a cumulative volume of 50% (d50).

Embodiment 2

The positive electrode active material according to the above embodiment can be used as a component of a magnesium secondary battery. The magnesium secondary battery includes a positive electrode, a negative electrode, and an electrolyte. The positive electrode contains a positive electrode active material as described in Embodiment 1. The electrolyte conducts magnesium ions.

Figure 2:
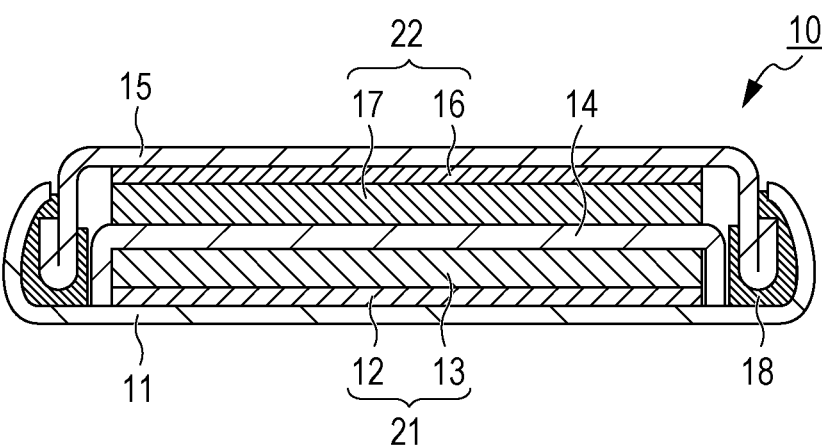
FIG. 2 is a cross-sectional diagram schematically illustrating an exemplary structure of a magnesium secondary battery.

FIG. 2 is a cross-sectional diagram schematically illustrating an exemplary structure of a magnesium secondary battery 10.

The magnesium secondary battery 10 includes a positive electrode 21, a negative electrode 22, a separator 14, a casing 11, a cap 15, and a gasket 18. The separator 14 is between the positive electrode 21 and the negative electrode 22. The positive electrode 21, the negative electrode 22, and the separator 14 are impregnated with a nonaqueous liquid electrolyte and are in the casing 11. The casing 11 is closed with the gasket 18 and the cap 15.

The casing 11 only needs to contain the positive electrode 21, the negative electrode 22, and the separator 14 therein. The casing 11, therefore, can be in any shape and can be made of any material. The casing 11 does not need to be the one illustrated in FIG. 2 but can be any known battery casing selected according to the purpose.

In terms of structure, the magnesium secondary battery 10 may be cylindrical, square, button-shaped, coin-shaped, or flat-plate.

The positive electrode 21 includes a positive electrode current collector 12 and a positive electrode active material layer 13 on the positive electrode current collector 12. The positive electrode active material layer 13 is between the positive electrode current collector 12 and the separator 14.

The positive electrode active material layer 13 contains a positive electrode active material as described in Embodiment 1. In such a configuration, there can be provided a positive electrode, for magnesium secondary batteries, having a large reversible capacity, a high reaction potential, and a high energy density.

Optionally, the positive electrode active material layer 13 may further contain conductive additive(s), ion conductor(s), and/or binder(s).

Examples of conductive additives include carbon materials, metals, inorganic compounds, and electrically conductive polymers. Examples of carbon materials include acetylene black, carbon black, graphite (black lead), carbon nanotubes, carbon nanofibers, graphene, fullerenes, Ketjenblack, carbon whiskers, needle coke, and carbon fiber. The graphite includes natural and artificial forms of graphite, and examples of natural graphite materials include vein and flake graphite. Examples of metals include copper, nickel, aluminum, silver, and gold. Examples of inorganic compounds include tungsten carbide, titanium carbide, tantalum carbide, molybdenum carbide, titanium boride, and titanium nitride. Examples of electrically conductive polymers include polyaniline, polypyrrole, and polythiophene. One of these materials may be used alone, or multiple ones may be used as a mixture.

Examples of ion conductors include gel electrolytes, organic solid electrolytes, and inorganic solid electrolytes. Examples of gel electrolytes include polymethyl methacrylate, or PMMA. An example of an organic solid electrolyte is polyethylene oxide. An example of an inorganic solid electrolyte is $MgSc_2Se_4$.

The binder(s) is used to improve adhesion between the materials forming the electrode. Examples of binders include polyvinylidene fluoride, vinylidene fluoride-hexafluoropropylene copolymers, vinylidene fluoride-tetrafluoroethylene copolymers, polytetrafluoroethylene, carboxymethyl cellulose, polyacrylic acid, styrene-butadiene rubber, polypropylene, polyethylene, and polyimides.

The formation of the positive electrode active material layer 13 is, for example, as follows. First, the positive electrode active material, a conductive additive, and a binder are mixed together. The resulting mixture is combined with an appropriate solvent, giving a positive electrode mixture in paste form. This positive electrode mixture is applied to the surface of the positive electrode current collector 12 and dried. The layer formed on the positive electrode current collector 12 is the positive electrode active material layer 13. The positive electrode active material layer 13 may be compressed to increase the electrode density.

The thickness of the positive electrode active material layer 13 is not critical. The thickness of this layer is, for example, larger than or equal to 1 μm and smaller than or equal to 100 μm.

The positive electrode current collector 12 is made of, for example, pure metal(s) or an alloy. More specifically, the positive electrode current collector 12 may be made of pure metal(s) including, or an alloy containing, at least one selected from the group consisting of copper, chromium, nickel, titanium, platinum, gold, aluminum, tungsten, iron, and molybdenum. The positive electrode current collector 12 may be a piece of stainless steel.

The positive electrode current collector 12 may be a porous or solid sheet. The positive electrode current collector 12 may be a porous or solid film. The sheet or film can be a piece of metal foil or mesh. There may be a coating of a conductive aid on the surface of the positive electrode current collector 12 to reduce the electrical resistance of the secondary battery, to give catalytic activity, or to improve adhesion between the positive electrode active material layer 13 and the positive electrode current collector 12. Examples of conductive aids include carbon materials, such as carbon itself.

The positive electrode current collector 12 may be a sheet or foil. The positive electrode current collector 12 may be a multilayer film.

If the casing 11 also serves as a positive electrode current collector, the positive electrode current collector 12 can be omitted.

The negative electrode 22 includes, for example, a negative electrode active material layer 17, which contains a negative electrode active material, and a negative electrode current collector 16. The negative electrode active material layer 17 is between the negative electrode current collector 16 and the separator 14.

The negative electrode active material layer 17 contains a negative electrode active material capable of storing and releasing magnesium ions. Examples of negative electrode active materials include carbon materials. Examples of carbon materials include graphite, non-graphitic carbon, and graphite intercalation compounds. Examples of non-graphitic carbon materials include hard carbon and coke.

Optionally, the negative electrode active material layer 17 may further contain conductive additive(s), ion conductor(s), and/or binder(s). Examples of conductive additives, ion conductors, and binders that can be used are the same as those described in relation to the positive electrode.

The thickness of the negative electrode active material layer 17 is not critical. The thickness of this layer is, for example, larger than or equal to 1 μm and smaller than or equal to 50 μm.

The negative electrode active material layer 17 may contain a negative electrode active material on which magnesium can precipitate and dissolve. Examples of negative electrode active materials in that case include magnesium metal and magnesium alloys. A magnesium alloy is an alloy of magnesium and, for example, at least one metal selected from the group consisting of aluminum, silicon, gallium, zinc, tin, manganese, bismuth, and antimony.

As for the material for the negative electrode current collector 16, examples are the same as those for the positive electrode current collector 12, described in relation to the positive electrode. The negative electrode current collector 16 may be a sheet or foil.

If the cap 15 also serves as a negative electrode current collector, the negative electrode current collector 16 can be omitted.

If the negative electrode current collector 16 is made of a material on which magnesium can precipitate and dissolve, the negative electrode active material layer 17 can be omitted. The entire negative electrode 22, therefore, may be a negative electrode current collector 16 on which magnesium precipitates and dissolves. The negative electrode current collector 16 in that case may be a piece of stainless steel, nickel, copper, or iron.

Examples of materials for the separator 14 include a thin microporous film, woven fabric, and nonwoven fabric. The separator 14 may be made of a polyolefin, such as polypropylene or polyethylene. The thickness of the separator 14 is, for example, larger than or equal to 10 μm and smaller than or equal to 300 μm. The separator 14 may be a single-layer film of one single material or may be a composite or multilayer film made of two or more materials. The porosity of the separator 14 is, for example, higher than or equal to 30% and lower than or equal to 70%.

The electrolyte can be a material that conducts magnesium ions.

The electrolyte is, for example, a nonaqueous liquid electrolyte. The nonaqueous liquid electrolyte contains nonaqueous solvent(s) and magnesium salt(s) dissolved in the nonaqueous solvent(s).

Examples of magnesium salts include $MgBr_2$, $MgI_2$, $MgCl_2$, $Mg(AsF_6)_2$, $Mg(ClO_4)_2$, $Mg(PF_6)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[N(SO_2CF_2CF_3)_2]_2$, $Mg[BF_3C_2F_5]_2$, $Mg[PF_3(CF_2CF_3)_3]_2$, and $Mg[B(OCH(CF_3)_2)_4]_2$. One of these magnesium salts may be used alone, or two or more may be used in combination.

The nonaqueous solvent(s) can be one(s) commonly used in secondary batteries. Examples of nonaqueous solvents include cyclic carbonates, linear carbonates, cyclic carboxylates, linear carboxylates, pyrocarbonates, phosphates, borates, sulfates, sulfites, cyclic sulfones, linear sulfones, nitriles, sultones, cyclic ethers, linear ethers, nitriles, and amides.

Examples of cyclic carbonates include ethylene carbonate, propylene carbonate, butylene carbonate, vinylene carbonate, fluoroethylene carbonate, 4,5-difluoroethylene carbonate, 4,4,4-trifluoroethylene carbonate, fluoromethylethylene carbonate, trifluoromethylethylene carbonate, 4-fluoropropylene carbonate, and 5-fluoropropylene carbonate. Compounds derived from these by replacing a subset of or all hydrogen groups with fluorine can also be used. Examples of fluorinated compounds include trifluoropropylene carbonate and fluoroethylene carbonate.

Examples of linear carbonates include dimethyl carbonate, ethyl methyl carbonate, diethyl carbonate, methyl propyl carbonate, ethyl propyl carbonate, and methyl isopropyl carbonate. Compounds derived from these by replacing a subset of or all hydrogen groups with fluorine can also be used.

Examples of cyclic carboxylates include γ-butyrolactone, γ-valerolactone, γ-caprolactone, ε-caprolactone, α-acetolactone, and derivatives thereof.

Examples of linear carboxylates include methyl acetate, ethyl acetate, propyl acetate, butyl acetate, methyl propionate, ethyl propionate, propyl propionate, butyl propionate, and derivatives thereof.

Examples of pyrocarbonates include diethyl pyrocarbonate, dimethyl pyrocarbonate, di-tert-butyl dicarbonate, and derivatives thereof.

Examples of phosphates include trimethyl phosphate, triethyl phosphate, hexamethyl phosphoramide, and derivatives thereof.

Examples of borates include trimethyl borate, triethyl borate, and derivatives thereof.

Examples of sulfates include trimethyl sulfate, triethyl sulfate, and derivatives thereof.

Examples of sulfites include ethylene sulfite and derivatives thereof.

Examples of cyclic sulfones include sulfolane and derivatives thereof. Examples of linear sulfones include alkyl sulfones and derivatives thereof. Examples of nitriles include acetonitrile, valeronitrile, propionitrile, trimethylacetonitrile, cyclopentanecarbonitrile, adiponitrile, pimelonitrile, and derivatives thereof. Examples of sultones include 1,3-propanesultone and derivatives thereof.

Examples of cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, and crown ethers.

Examples of linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

An example of a nitrile is acetonitrile.

An example of an amide is dimethylformamide.

The nonaqueous solvent(s) may include glyme(s). Glymes can be bidentate ligands for magnesium ions. Using glyme(s) helps improve the solubility of magnesium imide salts in the nonaqueous solvent(s). Examples of glymes include 1,2-dimethoxyethane (DME), diglyme, triglyme, and tetraglyme.

One of these solvents may be used alone, or two or more may be used in combination.

The electrolyte may be a gel electrolyte or solid electrolyte.

Examples of solid electrolytes include $Mg_{2-1.5x}Al_xSiO_4$, $Mg_{2-1.5y-0.5z}Al_{y-z}Zn_zSiO_4$, $MgZr_4(PO_4)_6$, $MgM1PO_4$, $Mg_{1-a}M2_aM3(M4O_4)_3$, and $Mg(BH_4)(NH_2)$. In these formulae, $0.1 \leq x \leq 1$, $0.5 \leq y \leq 1$, $0.5 \leq z \leq 0.9$, $y-z \geq 0$, $y+z \leq 1$, M1 is at least one element selected from the group consisting of Zr, Nb, and Hf, M2 is at least one element selected from the group consisting of Ca, Sr, Ba, and Ra, M3 is at least one element selected from the group consisting of Zr and Hf, M4 is at least one element selected from the group consisting of W and Mo, and $0 \leq a < 1$.

EXAMPLES

The following describes the present disclosure in further detail by examples. It should be noted that these examples are illustrative; no aspect of the disclosure is limited to them.

Example 1

Preparation of the Composite Sulfide

One point twenty-four grams (1.24 g) of MgS, 1.05 g of Ti, and 0.71 g of S were weighed out and put into an agate mortar. Using the agate mortar, the compounds were milled together inside an Ar-filled glove box with a dew point equal to or lower than $-50°$ C. The resulting mixture was sealed in Fritsch's PL-7 planetary ball mill cell inside the glove box. Five-millimeter zirconia balls, which were the medium, were put into the planetary ball mill cell, and the mixture was stirred for 30 hours at 800 revolutions per minute (rpm). The product was used as the composite sulfide according to Example 1. During the stirring, the planetary ball mill cell was allowed to stand for 10 minutes every hour.

The composite sulfide according to Example 1 was analyzed by powder x-ray diffractometry and ICP emission spectrometry. The measured powder x-ray diffraction pattern is presented in FIG. 1. The composition of the composite sulfide according to Example 1 determined by ICP emission spectrometry is presented in Table 1.

Preparation of the Positive Electrode

The composite sulfide according to Example 1, acetylene black as a conductive additive, and polytetrafluoroethylene (PTFE) as a binder were weighed out in a ratio by mass of 8:1:1, and the compounds were thoroughly mixed together using an agate mortar. The resulting mixture was shaped into a sheet, and a 5-mm×8-mm rectangle was cut out from the resulting positive electrode mixture sheet according to Example 1. The cut piece of the positive electrode mixture sheet was put on an end of a 5-mm×30-mm Al mesh, and the sheet and the mesh were bonded together by compression. The resulting strip was used as the positive electrode according to Example 1.

Preparation of the Test Cell

Figure 3:
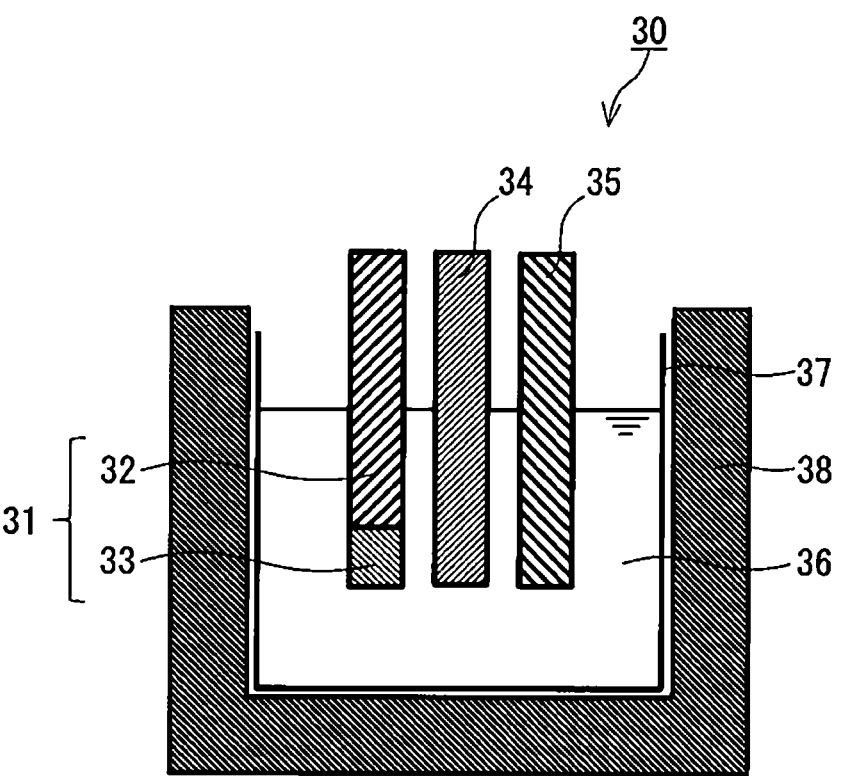
FIG. 3 is a schematic diagram illustrating an outline structure of a test cell according to the Examples.

FIG. 3 is a schematic diagram illustrating an outline structure of a test cell according to the Examples.

The test cell 30 includes a positive electrode 31, a reference electrode 34, a negative electrode 35, and a nonaqueous liquid electrolyte 36. The nonaqueous liquid electrolyte 36 is in a glass beaker 37. Around the glass beaker 37 is an aluminum block 38. The positive electrode 31 includes an aluminum mesh 32 and a positive electrode mixture 33. The positive electrode mixture 33 is at an end of the aluminum mesh 32. Part of the positive and negative electrodes 31 and 35 is in the nonaqueous liquid electrolyte 36.

A magnesium ribbon was cut down to a size of 5 mm×40 mm. The oxide coating on the surface of the resulting magnesium foil was scraped off, and the exposed surface was washed with hexane. Two of resulting strips were used as reference and negative electrodes 34 and 35.

Two point five milliliters (2.5 mL) of a nonaqueous liquid electrolyte 36 was put into a glass beaker 37. The nonaqueous solvent for the nonaqueous liquid electrolyte 36 was 1,2-dimethoxyethane (DME). The nonaqueous liquid electrolyte 36 was prepared by dissolving 0.3 mol/L of $Mg[B(OCH(CF_3)_2)_4]_2 \cdot 3DME$, an organic borate complex with DME ligands.

A test cell 30 having the structure in FIG. 3 was assembled by dipping the positive, reference, and negative electrodes 31, 34, and 35 into the nonaqueous liquid electrolyte 36. The preparation of the liquid electrolyte and the assembly of the test cell were done inside an Ar-filled glove box with a dew point equal to or lower than $-60°$ C. and an oxygen concentration by volume equal to or lower than 5 ppm.

Example 2

Preparation of the Composite Sulfide

The composite sulfide according to Example 2 was prepared in the same way as in Example 1, except that the materials weighed out and put into an agate mortar were 1.20 g of MgS, 1.11 g of Cr, and 0.69 g of S.

Preparation of the Positive Electrode

The positive electrode according to Example 2 was prepared in the same way as in Example 1, except that the composite sulfide according to Example 2 was used.

Preparation of the Test Cell

The test cell according to Example 2 was prepared in the same way as in Example 1, except that the positive electrode according to Example 2 was used.

Example 3

Preparation of the Composite Sulfide

The composite sulfide according to Example 3 was prepared in the same way as in Example 1, except that the materials weighed out and put into an agate mortar were 1.53 g of MgS and 2.47 g of NiS, and that the duration of the stirring of the resulting mixture in a planetary ball mill cell was 20 hours.

Preparation of the Positive Electrode

The positive electrode according to Example 3 was prepared in the same way as in Example 1, except that the composite sulfide according to Example 3 was used.

Preparation of the Test Cell

The test cell according to Example 3 was prepared in the same way as in Example 1, except that the positive electrode according to Example 3 was used.

Comparative Example 1

Preparation of the Composite Sulfide

The product according to Comparative Example 1 was prepared in the same way as in Example 1, except that the materials weighed out and put into an agate mortar were 1.15 g of MgS, 1.20 g of Co, and 0.65 g of S.

Charge and Discharge Test

A charge and discharge test of the test cells according to Examples 1 to 3 was conducted under the following conditions.

The test cell was placed on a hotplate at 60° C.

The inventors assumed the theoretical capacity of $MgTiS_2$ was 393 mAh/g. The test cell according to Example 1 was charged at a constant current that would be a C-rate of 0.01 C relative to this theoretical capacity. The constant current per unit weight, or per gram, of the positive electrode active material was 3.93 mAh/g. Charging was ended when the charge capacity reached 25% of the theoretical capacity. Then the test cell was allowed to stand for 5 hours.

Then the test cell was discharged at a current that would be a C-rate of 0.01 C. Discharging was ended when the potential at the positive electrode versus the reference electrode reached 0.1 V. The measured charge and discharge capacities of the test cell according to Example 1 are presented in Table 1.

The test cell according to Example 2 was charged and discharged in the same way as that according to Example 1, and its charge and discharge capacities were measured in the same way. The theoretical capacity, however, was assumed for $MgCrS_2$ and was 382 mAh/g. The results are presented in Table 1.

The test cell according to Example 3 was charged and discharged in the same way as that according to Example 1, and its charge and discharge capacities were measured in the same way. The theoretical capacity, however, was assumed for $MgNiS_2$ and was 364 mAh/g. The results are presented in Table 1.

TABLE 1

| | Composite sulfide composition by ICP | Charge capacity (mAh/g) | Discharge capacity (mAh/g) |
|---|---|---|---|
| Example 1 | $Mg_{1.03}Ti_{1.02}S_2$ | 98.3 | 52.8 |
| Example 2 | $Mg_{1.00}Cr_{1.01}S_2$ | 95.5 | 27.1 |
| Example 3 | $Mg_{1.15}Ni_{1.21}S_2$ | 91.1 | 45.5 |

Discussion

FIG. 1 is a graphical representation of measured powder x-ray diffraction patterns of the composite sulfides according to Examples 1 to 3. FIG. 1 also includes that of MgS, a material used to make the composite sulfides. MgS has a crystal structure that belongs to space group Fm-3m. The measured XRD patterns of the composite sulfides according to Examples 1 to 3 indicate the composite sulfides according to Examples 1 to 3 had a crystal structure that belonged to space group Fm-3m.

Figure 4:
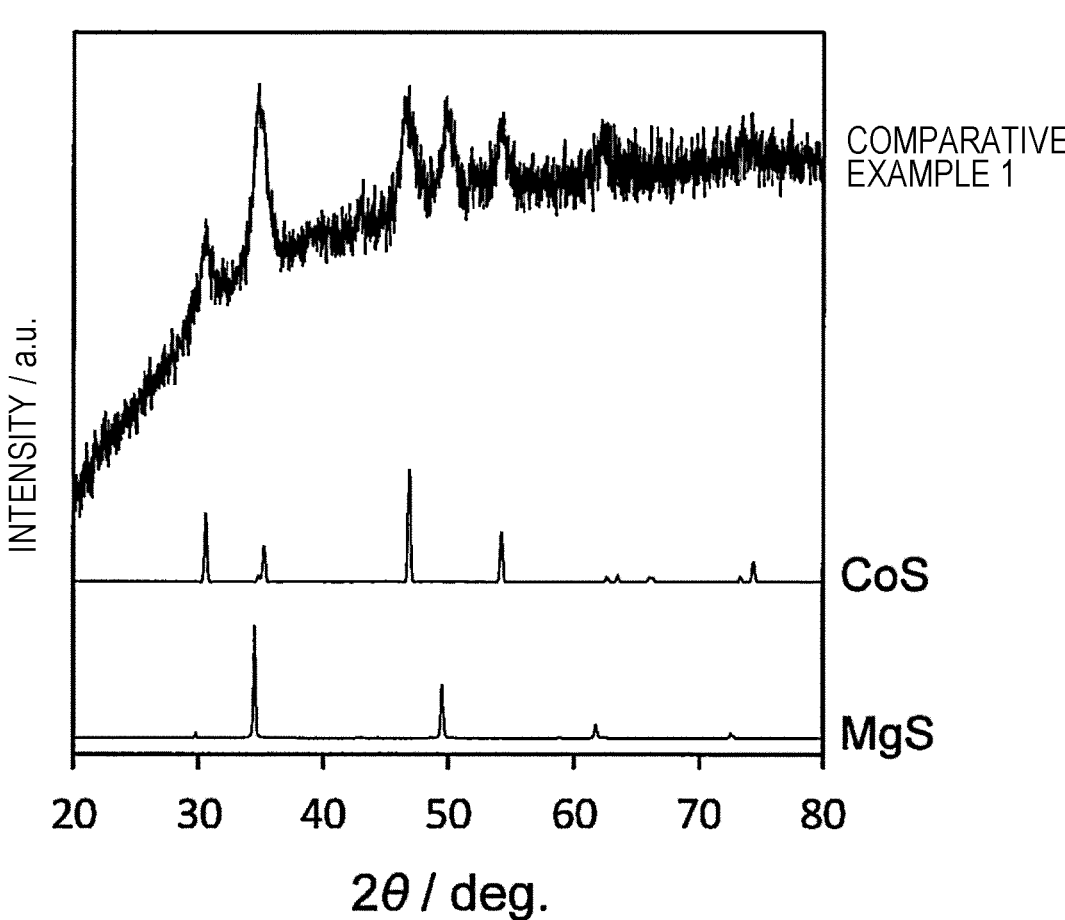
FIG. 4 is a graphical representation of measured powder x-ray diffraction patterns of the product according to the Comparative Example and MgS and a simulated pattern of CoS.

FIG. 4 is a graphical representation of the measured powder x-ray diffraction pattern of the product according to Comparative Example 1. FIG. 4 also includes that of MgS, a material used to make the composite sulfide. In addition to these, FIG. 4 presents a powder x-ray diffraction pattern of CoS. The powder x-ray diffraction pattern of CoS is a simulated spectrum for CoS, which has a crystal structure belonging to space group $P6_3/mmc$, based on the data of Inorganic Crystal Structure Database (ICSD) 29305.

In Examples 1 to 3, composite sulfides containing Mg and one of Ti, Cr, or Ni were obtained, and these composite sulfides had a crystal structure that belonged to space group Fm-3m. The inventors believe these composite sulfides were solid solutions in which MgS, a material used to make the composite sulfides, had Ti, Cr, or Ni in place of some Mg atoms while maintaining its crystal structure. The substituting metal does not need to be Ti, Cr, or Ni; the inventors believe if the same process is done with at least one element selected from the group consisting of Ti, V, Cr, Mn, Fe, Ni, Cu, Zr, Nb, Mo, Ta, and W, the product is a solid solution in which some Mg atoms have been replaced with the at least one element. The product according to Comparative Example 1 had separate MgS and CoS phases as demonstrated by its XRD spectrum; no solid solution of MgCoS was obtained in Comparative Example 1.

The cells made with the composite sulfides according to Examples 1 to 3 had large charge and discharge capacities. The composite sulfide according to an aspect of the present disclosure helps provide a high-capacity magnesium secondary battery.

The positive electrode active material according to an aspect of the present disclosure can be applied to magnesium secondary batteries.

What is claimed is:

1. A positive electrode active material comprising:
   a composite sulfide which, in an initial state prior to charging and discharging, is represented by a compositional formula $Mg_xM_yS_2$,
   where Mg is magnesium, M is at least one element selected from the group consisting of Ti, V, Cr, Mn, Fe, Ni, Cu, Zr, Nb, Mo, Ta, and W, and
   $0.8 < x < 1.3$, and $0.8 < y < 1.3$,
   wherein the composite sulfide in the initial state has a crystal structure belonging to space group Fm-3m.

2. The positive electrode active material according to claim 1, wherein M is at least one element selected from the group consisting of Ti, Cr, and Ni.

3. A magnesium secondary battery comprising:
   a positive electrode containing the positive electrode active material according to claim 1;
   an electrolyte; and
   a negative electrode.

4. The positive electrode active material according to claim 1, wherein M is at least one element selected from the group consisting of Ti, Nb, Mo, Ta, and W.

5. The positive electrode active material according to claim 1, wherein M is at least one element selected from the group consisting of Ti, Nb, Mo, Ta, and W and at least one element selected from the group consisting of V, Cr, Mn, Fe, Ni, Cu, and Zr.

* * * * *